(12) United States Patent
Bulin et al.

(10) Patent No.: US 8,841,584 B2
(45) Date of Patent: Sep. 23, 2014

(54) ELECTRIC DEICING DEVICE FOR PROPFAN-TYPE PROPELLER BLADES

(75) Inventors: Guillaume Bulin, Blagnac (FR); Severine Perret, Leguevin (FR)

(73) Assignee: Airbus Operations S.A.S., Toulouse (FR)

( * ) Notice: Subject to any disclaimer, the term of this patent is extended or adjusted under 35 U.S.C. 154(b) by 444 days.

(21) Appl. No.: 13/318,616

(22) PCT Filed: May 3, 2010

(86) PCT No.: PCT/FR2010/050841
§ 371 (c)(1), (2), (4) Date: Feb. 14, 2012

(87) PCT Pub. No.: WO2010/128239
PCT Pub. Date: Nov. 11, 2010

(65) Prior Publication Data
US 2012/0132633 A1     May 31, 2012

(30) Foreign Application Priority Data

May 5, 2009    (FR) ...................................... 09 52970

(51) Int. Cl.
*B60L 1/02*     (2006.01)
*B64D 15/12*     (2006.01)
*B64C 11/48*     (2006.01)
*B64D 27/02*     (2006.01)

(52) U.S. Cl.
CPC .......... *B64D 15/12* (2013.01); *B64D 2027/026* (2013.01); *Y02T 50/66* (2013.01); *B64C 11/48* (2013.01)
USPC ....................................................... 219/202

(58) Field of Classification Search
None
See application file for complete search history.

(56) References Cited

U.S. PATENT DOCUMENTS

| 2,391,994 | A | 1/1946 | McCollum |
| 5,112,191 | A | 5/1992 | Strock et al. |

(Continued)

FOREIGN PATENT DOCUMENTS

| DE | 199 46 806 | 4/2001 |
| FR | 950 666 | 10/1949 |
| FR | 2 645 499 | 10/1990 |

(Continued)

OTHER PUBLICATIONS

International Search Report Issued Feb. 24, 2011 in PCT/FR10/050841 Filed May 3, 2010.
U.S. Appl. No. 13/318,505, filed Nov. 2, 2011, Bulin, et al.

*Primary Examiner* — Shawntina Fuqua
(74) *Attorney, Agent, or Firm* — Oblon, Spivak, McClelland, Maier & Neustadt, L.L.P.

(57) ABSTRACT

A deicing device for propfan-type aircraft propulsion unit blades, wherein the propulsion unit includes a turbomachine that drives in rotation at least one rotor including a plurality of blades arranged around an annular crown moving with the blades, which forms with its outer wall part of the outer envelope of the propulsion unit, the outer envelope being subjected to atmospheric conditions outside the propulsion unit, the turbomachine generating a flow of hot gases that exit via an annular hot vein, which is concentric with the moving annular crown, and defined for part of its surface by an inner wall of the moving annular crown. The deicing device includes: a mechanism transforming thermal energy into electrical energy, within the moving annular part; a mechanism transferring the generated electrical energy towards the rotor blades; and a mechanism transforming the electrical energy into thermal energy onto at least a part of the surface of the blades.

12 Claims, 4 Drawing Sheets

(56) References Cited

U.S. PATENT DOCUMENTS

| | | | |
|---|---|---|---|
| 5,224,831 A * | 7/1993 | Hermans et al. | 416/129 |
| 2004/0080234 A1 | 4/2004 | Arel | |
| 2007/0261729 A1 * | 11/2007 | Hu | 136/204 |
| 2008/0152494 A1 | 6/2008 | Froman | |
| 2011/0024567 A1 * | 2/2011 | Blackwelder et al. | 244/134 D |

FOREIGN PATENT DOCUMENTS

| | | |
|---|---|---|
| WO | 03 078248 | 9/2003 |
| WO | 2006 124026 | 11/2006 |

* cited by examiner

ELECTRIC DEICING DEVICE FOR PROPFAN-TYPE PROPELLER BLADES

BACKGROUND OF THE INVENTION

The present invention falls within the field of aeronautical equipment. It concerns more specifically deicing devices. In this case, it relates in particular to the problem of deicing propeller blades.

During the various phases of flight, particularly on the ground, at take-off, climbing or landing, aircraft are regularly subjected to icing atmospheric conditions (cold surface+ambient humidity), which cause ice deposits to be created on various parts of the fuselage. These ice deposits modify the aircraft's aerodynamic performance, increase its mass and reduce its maneuverability.

Various anti-icing devices (that prevent ice forming on a surface of the aircraft) and deicing devices (that detach pieces of ice once they have formed) have been developed over decades and are already known to experts. For example, for the leading edges of wings, they use heating resistors that cause the ice to melt and to break into pieces removed by the airflow. In the same way, inflatable membranes are used intermittently to break ice while it is forming.

It is obvious that similar problems of fighting icing by anti-icing or deicing occur for the propeller blades in the case of propeller-driven airplanes. In this case, heating resistors are generally used, with an electrical generator installed in the propeller shaft and a transfer of current towards cables passing through this shaft towards the various blades (see patent document WO 97/24261, for example).

The amount of power required to ensure permanent deicing of the blades then leads to the preferred choice of heating the blades one after the other, in cyclical fashion. This mode of deicing at regular intervals reduces the electrical power needed and the size of the generator.

In contrast, in the case of propulsion units known under the generic name "propfan", comprising two counter-rotating propellers with an open rotor (not faired) driven by a differential gearbox which is itself driven by a turbomachine, the propellers are arranged in annular fashion around the core of this turbomachine and this arrangement prevents the use of the devices mentioned previously.

Rotating contact devices are known in addition that ensure the transmission of electrical power between a fixed shaft and a moving annular part by using electro-conductive brushes fixed on the shaft that slide on an annular track of the rotating part.

In this case, the power to be transferred to device the blades of a propfan is close to some twenty kilowatts, which implies devices of significant size. One of the main drawbacks of these rotating contact systems is linked to the speed of the brushes in relation to the moving track, this speed being in general close to one hundred meters per second and depending naturally on the diameter of the annular track and on the speed of rotation of this part.

The consequence of this for all these rotating contact systems is rapid wear of the brushes, leading to reduced performance and a requirement for frequent and costly maintenance. The absence of lubrication for these brushes (for reasons of complexity) also contributes to reducing this lifespan significantly.

In the case of the front propeller of a propfan, the diameter of the turbomachine's core leads to a relative speed of the moving part in relation to the stationary part of the order of four hundred meters per second, which makes systems using brushes and a moving track unusable in practice, as this exceeds the specifications of devices available on the market.

The situation is further exacerbated in the case of propfans by the counter-rotating characteristic of the two propellers.

Lastly, propfans are characterized by the high temperature of the exhaust flow they generate, about 800° C. at the outlet; this gas flow passes between the propulsion unit's shaft and the two propellers and makes it difficult to install materials that may suffer in high-temperature conditions.

BRIEF SUMMARY OF THE INVENTION

The objective of the present invention is therefore to propose a device for deicing/anti-icing of blades for propfan-type propulsion units, which avoids the drawbacks mentioned above.

To this end, the invention envisages a deicing device for propfan-type aircraft propulsion unit blades, where said propulsion unit comprises a turbomachine that drives in rotation at least one rotor comprising a plurality of blades arranged around an annular crown moving with these blades, which forms with its outer wall part of the outer envelope of the propulsion unit, said outer envelope being subjected to the atmospheric conditions outside the propulsion unit, said turbomachine generating a flow of hot gases that exit via an annular hot vein, which is concentric with the moving annular crown and defined for part of its surface by the inner wall of said moving annular crown, the deicing device comprising:
  means of transforming the thermal energy into electrical energy, within the moving annular part,
  means of transferring the electrical energy generated towards the rotor blades,
  means of transforming the electrical energy into thermal energy onto at least a part of the surface of said blades.

Preferably, the means of transforming thermal energy into electrical energy comprise an electrical generator made of a set of Seebeck-effect thermal diodes, arranged between the inner wall and the outer wall of the annular crown, which act, respectively, as hot source and cold source for these diodes, said thermal diodes being laid out in series and parallel groups so as to achieve as the output of the electrical generator a voltage and amperage compatible with the deicing requirements of the rotor blades.

According to an advantageous embodiment, the thermal diodes are of $Pb_{0.5}Sn_{0.5}Te$ type.

According to an advantageous embodiment, caloducts are provided between one of the annular crown's walls and one surface of the thermal diodes.

Alternatively, the device for deicing blades comprises means of channeling either hot air from the hot annular vein or outside air towards a wall on which the thermal diodes are installed.

It is understood that it is necessary to cater for the distance that exists in the propulsion unit between the hot and cold areas, in view of their use as thermal diode hot and cold sources.

According to various arrangements that may be used together:
  the electrical generator extends in annular fashion over substantially the whole of the inner perimeter of the annular crown,
  in the case of a rotor comprising n blades, each 360°/n sector of the electrical generator supplies electrical energy to one blade with a suitable amount of power for its deicing, the device comprises means of controlling the temperature difference between the hot and cold sources of the thermal diodes, controlled according to the instructions of an electronic control unit for the current generated by the diodes.

It is understood that this last arrangement allows a feedback process to be created that maximizes in real-time the energy yield of the thermal diodes.

To optimize the use of the electrical energy generated by the electrical generator, this last comprises favorably an electronic control unit to which all the diodes supply the generated current; this electronic control unit is designed to measure the available electrical power and distribute it amongst the blades and to select a cyclical supply mode for the blades in case the amount of power generated is below a predefined threshold.

The threshold will be selected such as to characterize the moment when the amount of power generated is insufficient for a permanent parallel supply to all the blades.

Preferably, the heating resistors of the blades are permanently supplied and therefore all the blades are supplied simultaneously.

BRIEF DESCRIPTION OF THE SEVERAL VIEWS OF THE DRAWINGS

The description that follows, given solely as an example of an embodiment of the invention, is made with reference to the figures included in an appendix, in which.

DETAILED DESCRIPTION OF THE INVENTION

Figure 1:
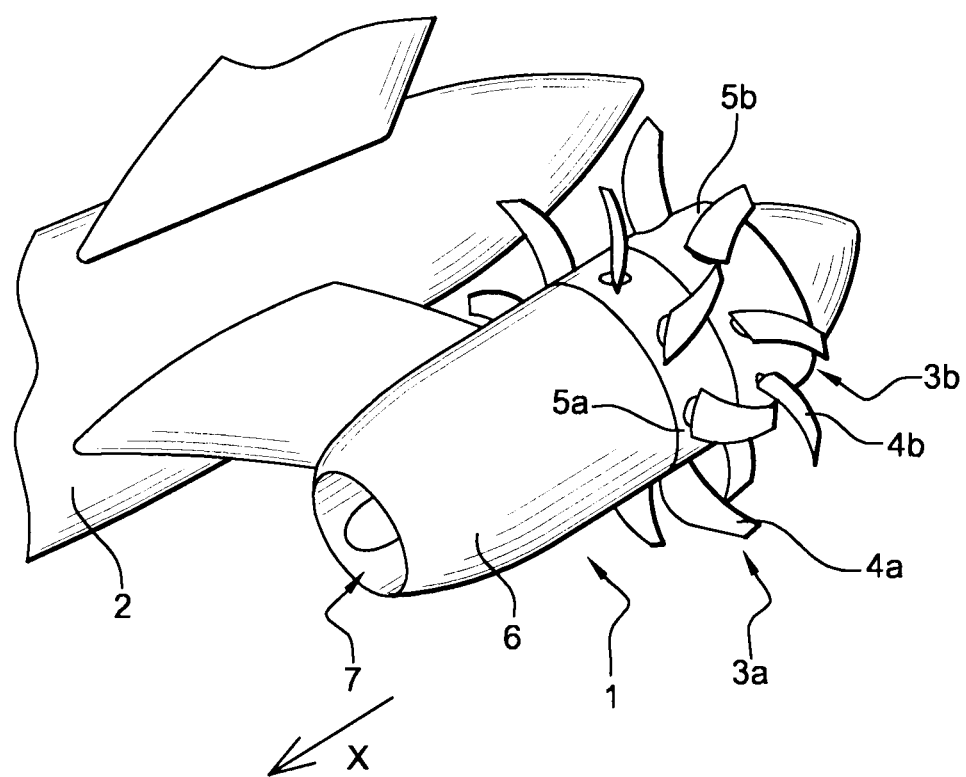
FIG. 1 shows a propfan-type propulsion unit, to which the invention can be applied.

The invention is destined to be used in an airplane propulsion unit 1, for example of the type called "propfan", as shown in FIG. 1. Such propulsion units are envisaged for future aircraft. In the example of implementation illustrated here, two propfan propulsion units 1 are attached by engine pylons, on both sides of the rear part of an aircraft fuselage 2.

Each propfan propulsion unit 1 comprises here two counter-rotating rotors 3a, 3b each comprising a set of blades 4a, 4b, which are equidistant and arranged at the rear of the propulsion unit 1. The blades 4a, 4b of each rotor 3a, 3b protrude from an annular crown 5a, 5b, which is mobile with this rotor, the outer surface of which is located in the continuity of the outer envelope 6 of the propulsion unit.

Figure 2:
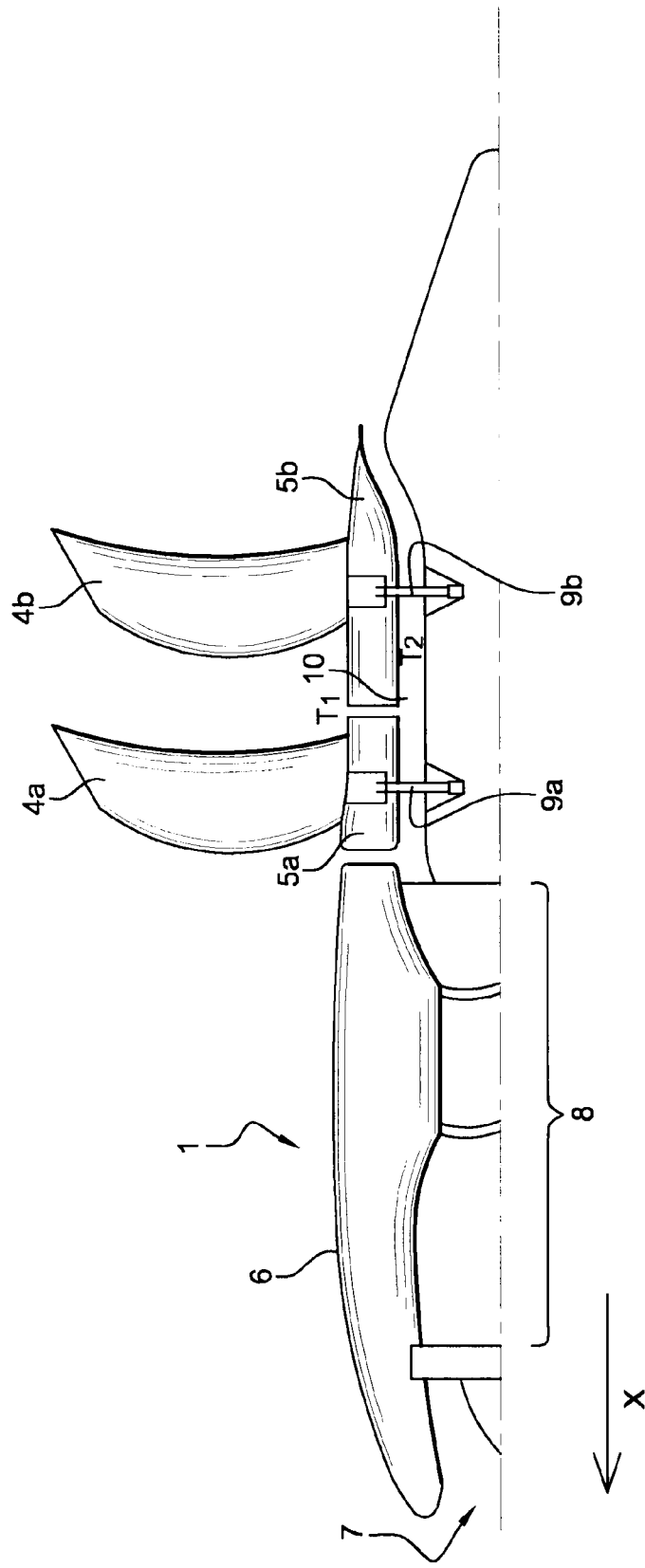
FIG. 2 illustrates such a propulsion unit in a very schematic cross-section view.

As shown schematically in FIG. 2 the propfan propulsion unit 1 comprises an air inlet 7 that supplies a turbomachine 8. This turbomachine 8 comprises an axial portion driven in rotation when the turbomachine is running. In turn, this shaft drives the shafts 9a, 9b of the blades 4a, 4b of the two counter-rotating rotors 3a, 3b via mechanical transmissions not shown in FIG. 2.

The hot gases generated by the turbomachine 8 when in operation are discharged through an annular hot vein 10 having its outlet located at the rear of the two rotors 3a, 3b.

The realization details of "propfans" and their components—rotors, turbomachine, transmission—as well as their dimensions, materials etc. are beyond the scope of the present invention. The elements described here are therefore provided only for information purposes, to facilitate understanding of the invention in one of its non-limiting examples of implementation.

As is apparent from the description above, during the aircraft's flight, outside air, at a temperature of between +30° C. near the ground and −50° C. at altitude, circulates along the annular crowns 5a, 5b of the propellers, substantially in the direction opposite to the longitudinal axis X of movement of the aircraft.

At the same time, the gases circulating within the hot air vein 10 are at a temperature usually ranging between 600 and 800° C.

The deicing device according to the invention takes advantage of this significant temperature difference at a few centimeters distance by using Seebeck-effect assemblies that allow thermal energy to be transformed into electrical energy.

As a preliminary, it is stated that the thermoelectric effect (Seebeck effect) is defined by the potential difference between the two terminals of a conductor when they are subjected to different temperatures. This effect is used in temperature measurements using thermocouples. This is the opposite of the Peltier effect, in which applying a potential difference between the terminals of a conductor causes the creation of a temperature difference between these terminals.

Figure 3:
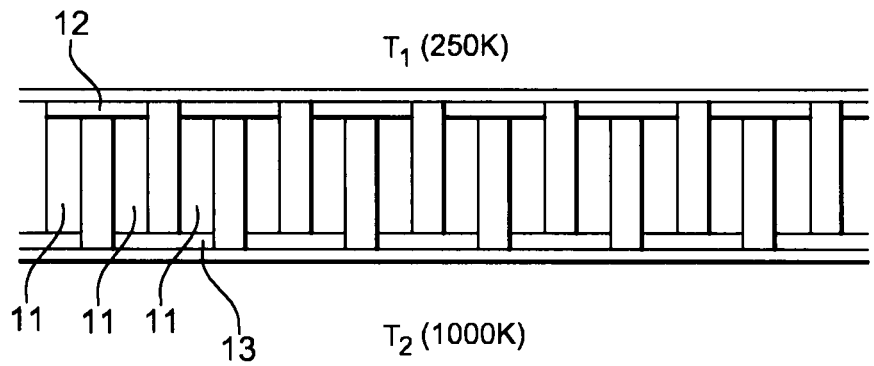
FIG. 3 shows schematically the assembly principle of a Seebeck-effect electrical generator.

Seebeck-effect power generation generally implies creating closed circuits comprising a set of conductors 11, linked two by two by junctions 12, 13, one of them subjected to a first temperature T1 and the other to a second temperature T2 (FIG. 3).

Various studies show that the materials that provide the best thermoelectric yield are those that fulfill requirements of high electrical conductivity, low thermal conductivity and high Seebeck coefficient. Several materials suitable for use in thermal diodes are currently known. Amongst these, are Mercury Cadmium Telluride ($Hg_{0.86}Cd_{0.14}Te$), Bismuth telluride ($Bi_2Te_3$), Silicon nano threads, etc.

It should also be noted that thermoelectric materials each have favorable characteristics within a given temperature range (Lead telluride around 550-750K, Bismuth telluride around 250-350K, etc.) Therefore, in cases where the temperature difference between hot (T2) and cold (T1) areas, which is the case for example in this implementation example on a propfan propulsion unit (T1 close to 250K and T2 close to 1000K) it is advantageous to use several superposed materials to make up each conductor 11.

The yield for conversion between thermal energy and electrical energy is currently of the order of 30% of the ideal Carnot yield for a 300K temperature difference between the hot and cold areas, which corresponds to a theoretical yield of 13% approximately (13% of the thermal energy converted to electrical energy). With a 700K temperature difference, an 18% yield is obtained.

Because of the mass characteristics of commercially-available diodes, a yield of 30% of the Carnot ideal corresponds to a power-to-weight ratio of 1,000 watts/kg of installed diodes.

Figure 4:
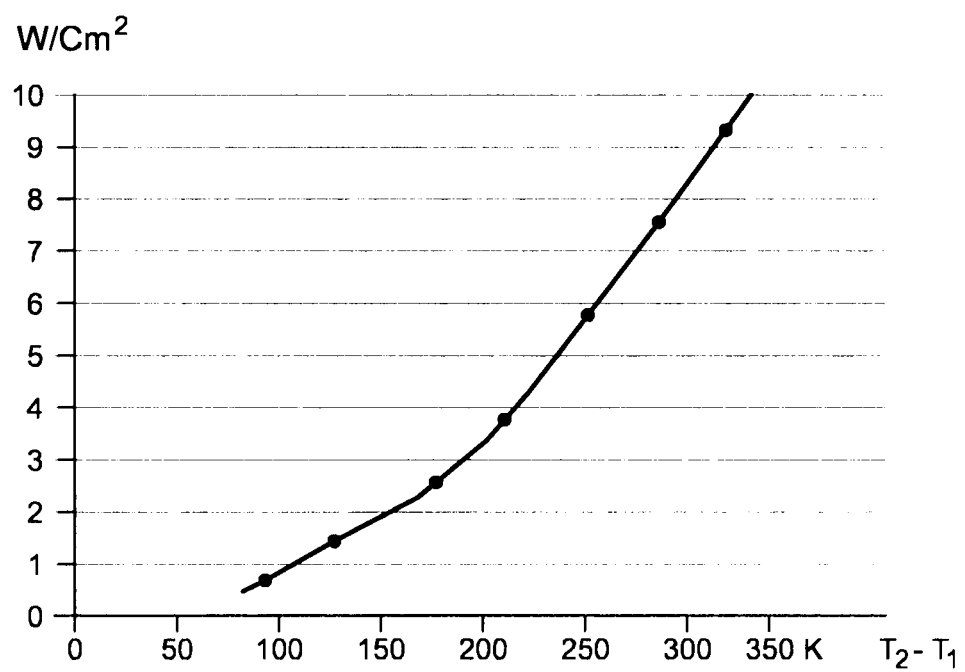
FIG. 4 shows the electrical power density that can be obtained with a commercially available thermal diode, depending on the available temperature difference.

FIG. 4 illustrates the electric power density that can be achieved per unit of area, depending on the available temperature difference, for a commercially available $Pb_{0.5}Sn_{0.5}$ type thermal diode. It can be seen that for temperature gradient values of the order of 350K, electrical power of 10 watts/cm$^2$ can be obtained.

These values demonstrate the compatibility of using thermal diodes with the constraints on available size, volume and mass and of required deicing power for a propfan propulsion unit.

Indeed, this last generates at least 200 kW of thermal power, evacuated via the annular hot air vein 10.

Deicing a rotor of the propfan requires approximately 10 kW of electrical power. Therefore, deicing the two rotors 3a, 3b of the propfan requires 20 kW. The mass of the thermal diodes required to supply this electrical power is therefore approximately 20 kg.

This value is compatible with existing mass constraints on aircraft and with volumetric constraints linked to the design of the rotors 3a, 3b of propfans. Effectively, each annular crown 5a, 5b has an inner wall 15a, 15b and an outer wall 14a, 14b, separated by some twenty centimeters approximately, for an annular crown 5a, 5b inner diameter of several tens of centimeters and an annular crown 5a, 5b width (along the longitudinal axis X) of a few tens of centimeters.

Figure 5:
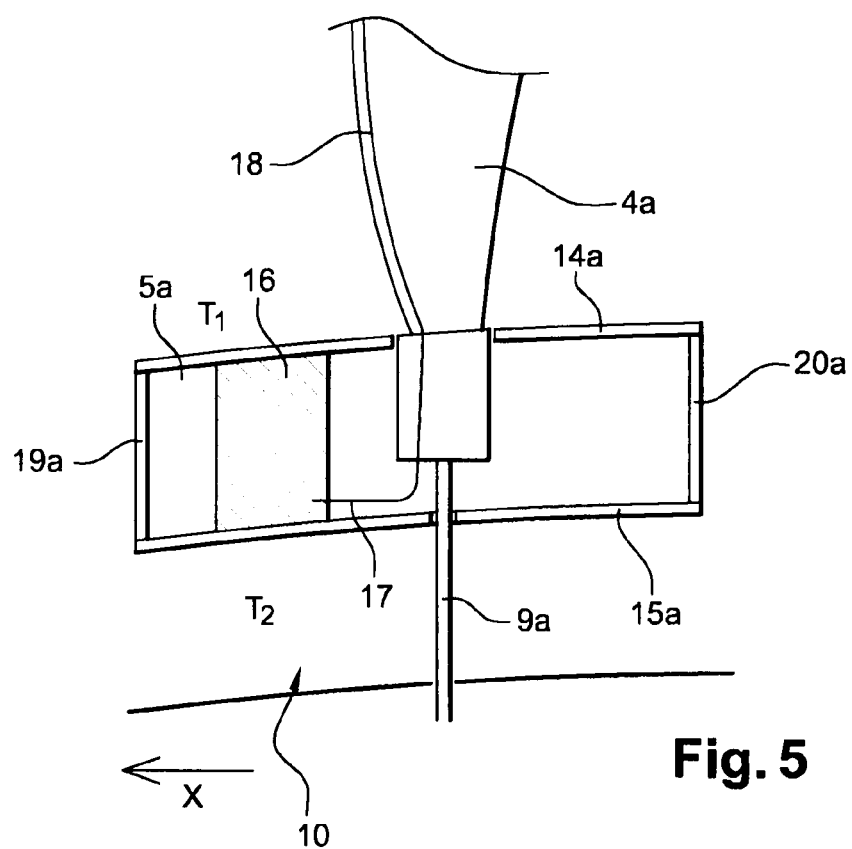
FIG. 5 illustrates a deicing device for blades according to the invention.

The deicing device for rotor blades 4a, 4b according to the invention (FIG. 5) is described here for the forward rotor 3a of the propulsion unit under consideration. An identical device is envisaged for the aft rotor 3b. The device uses the space available within the annular crown 5a of each rotor 3a to place a thermal diode 22 electrical generator 16.

It comprises in addition, in this non-limiting example, a set of cables 17 designed to transfer the generated electrical energy towards the blades 4a of the rotor 3a.

Lastly, each blade 4a is fitted with a set of resistors 18 to heat the areas to device or anti-ice, e.g. the leading edge of blade 4a, etc.

Figure 6:
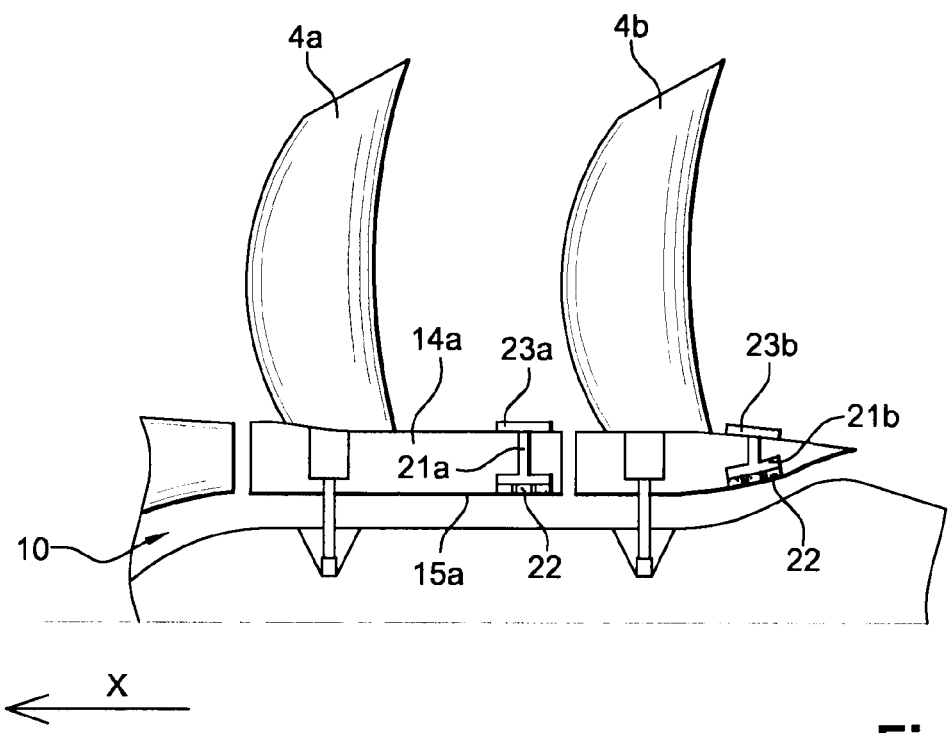
FIG. 6 illustrates an implementation example of the thermal diodes on the two rotors of the propfan.

The electrical generator 16 is made of a set of thermal diodes 22 installed between the inner wall 15a and the outer wall 14a of the annular crown 5a. FIG. 6 illustrates an implementation example of these thermal diodes 22 on the two rotors 3a, 3b of the propfan.

The thermal diodes 22 under consideration are, for example, of $Pb_{0.5}Sn_{0.5}Te$, delivering a 13% yield approximately.

Depending on the normal operating thickness of the thermal diodes 22 under consideration between the cold source (the outer wall 14a, 14b of each annular crown 5a, 5b) and the hot source (the inner wall 15a, 15b of each annular crown 5a, 5b opposite the annular hot vein 10), caloducts 21 of know type are installed between one of the walls of the annular crown 5a and a surface of the thermal diodes 22. On the cold source side, the device comprises advantageously a heat sink 23, for example in the form of metal blades parallel to the airflow (i.e. to the aircraft's longitudinal axis) creating a large thermal exchange surface with the outside environment.

It is clear that, as a variant, it is possible to invert this layout. The thermal diodes 22 are then positioned near the outer wall 14a, 14b of each annular crown 5a, 5b. In this case, the heat sinks 23 are installed within the annular hot vein 10, on the inner wall 15a, 15b of each annular crown 5a, 5b and the caloducts 21 transport the heat from this hot source towards the thermal diodes 22.

These thermal diodes 22 are laid out in series and parallel groups by means known per se to achieve, at the output of the electrical generator 16, a voltage and amperage compatible with the deicing requirements of the rotor 3a blades 4a.

Preferably, the two walls 14a, 15a of the annular crown 5a (the walls 14b, 15b of the annular crown 5b, respectively) are made of a metallic material or in any event, a very good thermal conductor. The inner wall 15a is, for example, made of titanium and the outer wall 14a of aluminum. The lateral walls 19a, 20a of this annular crown 5a are made of a material with low thermal conductivity so that the thermal flow goes preferably past the thermal diodes 22.

In the implementation considered here as an example, the electrical generator 16 extends over the whole of the inner perimeter of the annular crown 5a and over a width of approximately ten centimeters of said annular crown 5a.

In the case of a rotor 3a comprising 12 blades 4a, each 30° sector of the electrical generator 16 supplies electrical energy to one blade with approximately 1 kW of power for its deicing. The mass of the thermal diodes 22 represented is of the order of 1 kg per 30° sector of the annular crown 5a. More generally, for n blades, each 360°/n sector supplies electrical energy to one blade 4a.

This supply's transfer cable 17 goes through or very close to the shaft 9a of the blade 4a to follow its changes when its settings change during the flight.

The transfer cable 17 supplies a set of heating resistors 18 of a type know per se; these heating resistors 18 (as well as their layout on the surface of the blade) and this transfer cable 17 are similar to those used in the case of current transfer between the stator (forward part of the propulsion unit) and the rotor 3a by rotating contacts.

In operation, the yield of the electrical generator 16 becomes significant as soon as the turbomachine 8 is started since the temperature difference T2−T1 is already, on the ground, several hundreds of degrees K. In the operating mode chosen here as an example, the heating resistors 18 for the blades 4a are permanently supplied and all the blades 4a are supplied simultaneously; this is made possible by the available power of 10 kW per rotor approximately. In devices of the previous state of the art, the blades 4a were generally supplied in cyclical fashion, one after the other because of the lower available power. Besides the fact that anti-icing performance was significantly decreased, this procedure brought about the need for an electronic control unit for this cyclical supply, which increased the mass of the whole.

It is apparent from the description that the electrical generator according to the invention removes the problems caused by fast rotating contacts such as used in the previous state of the art. It utilizes an energy resource that is partially lost by taking advantage of the heat generated by the propulsion unit that passes under the crown of the rotor.

This facilitates the maintenance of the blade deicing mechanism.

In addition, the absence of moving parts in this generator causes increased reliability.

Lastly, its installation requires no significant changes to the propulsion unit.

The scope of this invention is not limited to the details of the embodiments considered above as an example, but on the contrary extends to modifications in the reach of the expert.

A transfer of electrical energy from the generator 16 to the heating resistors 18 of the blade 4a by a cable 17 going through the shaft 9a of the blade 4a was mentioned in the description. Alternatively, the current transfer towards the blade 4a is realized, at the output of the electrical generator 16, by a conductive brush and conductive track on the shaft of the blade 4a, both of types known per se, the relative speeds of these two parts being here very low.

In a variant, it is of course possible to replace the heating resistors 18 used for deicing the blades by any other deicing means using an electrical energy source, without changing the utilization principle of this invention. In the same manner, it is possible to retain cyclical deicing of the blades 4a, for example, for cases of particular icing conditions.

In another variant, to facilitate the installation of the thermal diodes 22, ducts channeling either hot air from the hot annular vein 10 or outside air towards a wall on which the thermal diodes 22 are installed are used instead of the caloducts 21 designed to reduce the distance between the hot source (inner wall 15a of the annular crown 5a) and the cold source (outer wall 14a of the annular crown 5a).

In another variant a temperature control device is fitted between the hot and cold sources of the thermal diodes 22. In effect, these thermal diodes 22 have an optimal yield point for a given temperature difference and any variance from this temperature difference causes a decrease in the electrical current generated.

Such a control device can comprise air ducts that mix hot and cold air towards the hot source of the diodes, in accordance with the instructions of an electronic control unit for the current generated by the diodes. This creates a feedback device that maximizes in real time the energy yield of the thermal diodes 22, whatever their age and the change in their maximum yield point.

It was mentioned in the description that each blade 4a is supplied by a sector of the thermal diodes 22. Alternatively, it can be decided, for the sake of redundancy, that all the thermal diodes 22 supply the generated current to a single electronic control unit (not shown in FIG. 5) that measures the available electrical power and distributes it to the blades 4a, or even selects a cyclical supply mode for the blades 4a, in cases where the generated power is insufficient for all the blades to be supplied permanently and in parallel.

In the same way, the electronic control unit communicates, by means not detailed here because they are outside the scope of this invention, the power generated by the thermal diodes 22 towards the airplane's pilots.

The invention claimed is:

1. A deicing device for propfan-type aircraft propulsion unit blades, where the propulsion unit includes a turbomachine that drives in rotation at least one rotor including a plurality of blades, an outer envelope of the propulsion unit being subjected to atmospheric conditions outside the propulsion unit, the turbomachine generating a flow of hot gases that exit via an annular hot vein, the deicing device comprising:
    an annular crown that moves with the blades, an outer wall of the annular crown forming part of the envelope of the propulsion unit and an inner wall of the annular crown defining a portion of the annular hot vein;
    means for transforming thermal energy, supplied by the annular vein, into electrical energy, positioned between the inner wall and the outer wall of the annular crown;
    means for transferring the generated electrical energy towards the rotor blades; and
    means for transforming the electrical energy into thermal energy and configured to be installed onto at least a part of the surface of the blades.

2. A deicing device according to claim 1, wherein the means for transforming thermal energy into electrical energy comprises an electrical generator including a set of Seebeck-effect thermal diodes, configured to be arranged between the inner wall and the outer wall of the annular crown, which act, respectively, as hot source and cold source for the thermal diodes, the thermal diodes being laid out in series and parallel groups so as to achieve as the output of the electrical generator a voltage and amperage compatible with deicing requirements of the rotor blades.

3. A deicing device according to claim 2, wherein the thermal diodes are of $Pb_{0.5}Sn_{0.5}Te$ type.

4. A deicing device according to claim 2, further comprising caloducts configured to be installed between one of the walls of the annular crown and on a surface of the thermal diodes.

5. A deicing device according to claim 2, further comprising means for channeling either hot air from the annular vein or outside air towards a wall on which the thermal diodes are installed.

6. A deicing device according to claim 2, wherein the electrical generator is configured to extend in annular fashion over substantially a whole of an inner perimeter of the annular crown.

7. A deicing device according to claim 6, wherein, in a case of a rotor comprising n blades, each 360°/n sector of the electrical generator supplies electrical energy to one blade with a suitable amount of power for its deicing.

8. A deicing device according to claim 2, further comprising means for controlling a temperature difference between the hot and cold sources of the thermal diodes, controlled according to instructions of an electronic control unit for current generated by the thermal diodes.

9. A deicing device according to claim 2, further comprising an electronic control unit to which all the thermal diodes supply the generated current; the electronic control unit configured to measure available electrical power and to distribute it among the blades and to select a cyclical supply mode for the blades in case an amount of power generated is below a predefined threshold.

10. A deicing device according to claim 2, wherein the means for transforming thermal energy supplies the generated electrical to all the blades simultaneously.

11. An aircraft propulsion unit, comprising a device according to claim 1.

12. A deicing device according to claim 1, wherein the means for transforming the electrical energy into thermal energy are resistors at a leading edge of the blades.

* * * * *